Aug. 24, 1965     Z. J. JANIA     3,202,012
INFINITELY VARIABLE POWER TRANSMISSION CONTROL SYSTEM
Filed Oct. 10, 1963     6 Sheets-Sheet 2

Fig. 2

INVENTOR:
ZBIGNIEW J. JANIA
BY
ATTORNEYS.

Aug. 24, 1965  Z. J. JANIA  3,202,012
INFINITELY VARIABLE POWER TRANSMISSION CONTROL SYSTEM
Filed Oct. 10, 1963  6 Sheets-Sheet 3

INVENTOR:
ZBIGNIEW J. JANIA
BY
ATTORNEYS

United States Patent Office 3,202,012
Patented Aug. 24, 1965

3,202,012
INFINITELY VARIABLE POWER TRANS-
MISSION CONTROL SYSTEM
Zbigniew J. Jania, Detroit, Mich., assignor to Ford Motor
Company, Dearborn, Mich., a corporation of Delaware
Filed Oct. 10, 1963, Ser. No. 315,266
12 Claims. (Cl. 74—472)

My invention relates generally to a power transmission mechanism having an infinitely variable torque ratio characteristic, and more particularly to a control system for use with an infinitely variable torque ratio drive in an automotive vehicle driveline.

I contemplate that the improvements of my invention can be applied to an infinitely variable torque ratio drive mechanism in a driveline that includes a throttle controlled internal combustion engine. According to a principal feature of my invention, the operating characteristics of the drive are sensed by the control system which responds by appropriately changing the speed ratio of the drive for any given load and for any given demand for engine torque that may be imposed by the operator. The over-all operating performance of the driveline thus may be characterized by a maximum degree of engine fuel economy for all driving conditions.

It is well known that the operating efficiency of an internal combustion engine of the piston type, as measured by the specific fuel consumption, may vary within wide limits during operation as the operating conditions are varied. The horsepower requirements of the engine, of course, are determined by the road conditions, such as the grade, mechanical friction, aerodynamic drag, etc., for any given vehicle speed. The vehicle speed that is selected by the vehicle operator will be accompanied by a corresponding load imposed by the road conditions at that speed. Each selected vehicle speed can be achieved with any of a variety of engine speeds, and the engine speed in turn depends upon the speed ratio of the drive with which the engine is used. Each engine speed, of course, results in a different brake specific fuel consumption for the driving conditions that prevail. It is desirable, therefore, to properly match the engine and variable speed ratio drive to obtain a minimum brake specific fuel consumption for each vehicle speed selected by the operator and for each corresponding road load. More precisely, the fuel economy, as determined in part by the ratio of transmission efficiency to brake specific fuel consumption, should be made a maximum by providing a control system that will respond to control variables to produce a maximum value at that ratio for each road load. Since the transmission efficiency may vary as the engine power changes, it may be desirable to choose a value for brake specific fuel consumption that is slightly different than the minimum value to compensate for any adverse influence on transmission efficiency. The control system then can be calibrated accordingly. The term "transmission efficiency," as used in this description, means that factor by which the horsepower input to the transmission must be multiplied to produce the actual shaft horsepower on the power output end of the transmission.

In accomplishing the foregoing objective, I have provided a control system that will allow the speed of the engine to be maintained at a constant value for any given demand for engine torque by the vehicle operator. In the case of a throttle controlled internal combustion engine, the driver demand for engine torque is related in magnitude to the position of the vehicle accelerator linkage which in turn is mechanically connected to the engine throttle valve. My improved system will cause simultaneously the engine throttle valve to assume a setting that will allow the engine to operate with a minimum brake specific fuel consumption for the prevailing vehicle speed and road load. The vehicle speed for any given accelerator position then is determined by the road conditions and the vehicle operator can select the speed as road conditions change simply by controlling the position of the accelerator linkage. The provision of a control system of this type is a principal object of my invention.

It is necessary in such a control system to measure engine speed by means of an appropriate speed sensing mechanism and to make provision for comparing that engine speed with the speed that is demanded by the vehicle operator. The difference between the actual speed and the so-called "command" speed is amplified and then sensed by the control system so that an appropriate speed ratio change in the drive can be accomplished. The engine speed thus is maintained at a constant value. The control system also must adjust the engine carburetor throttle position for the corresponding corrected engine speed that is established. The value of the engine carburetor throttle position then must be related functionally to the speed-torque characteristics of the engine and the road load requirements as well as the vehicle weight and other physical vehicle characteristics. The provision of a control system that will function in this fashion is another object of my invention.

In measuring the engine speed I employ an engine driven fluid pressure governor that establishes a fluid pressure signal that is related in magnitude to the engine speed. The actual value of the speed signal is proportional to the square of the engine speed. The control system, however, requires a linear speed signal as it influences the ratio changing structure of the drive. It is an object of my invention, therefore, to provide a means for modifying the non-linear signal produced by the governor mechanism so that the resulting signal that is transmitted to the drive ratio controlling system will be related linearly to engine speed.

I contemplate that my improved control system will allow the vehicle operator to obtain a rapid increase in torque ratio as he demands more torque by advancing rapidly the accelerator linkage to an advanced engine throttle "kickdown" position. This, of course, causes an immediate adjustment of the engine carburetor throttle valve, but the inertia of the engine results in a delayed response of the engine. The response of the control system to this demand for increased torque, in contrast, is relatively instantaneous. It is another object of my invention, therefore, to provide a mechanical time delay network that will function to synchronize the responses of the engine and the control system and in this way avoid an undesirable sharp deceleration of the vehicle for a short period of time after the acceleration linkage is advanced to the so-called "kickdown" position.

It is another object of my invention to provide a control system for an infinitely variable drive of the type above set forth wherein provision is made for overruling the automatic drive ratio controlling elements when coast braking is desired. The infinitely variable drive thus can be used to provide an optimum degree of engine braking for any given vehicle speed.

It is another object of my invention to provide a control system of the type above set forth wherein the vehicle wheel brakes are caused to function in cooperation with the coast brake controlling elements of the drive so that the degree of coast braking provided by the drive is related in magnitude to the degree of braking effort imposed by the vehicle operator on the vehicle wheel brakes.

Further objects and features of my invention will become apparent from the following description and from the accompanying drawings, wherein.

Figure 1:
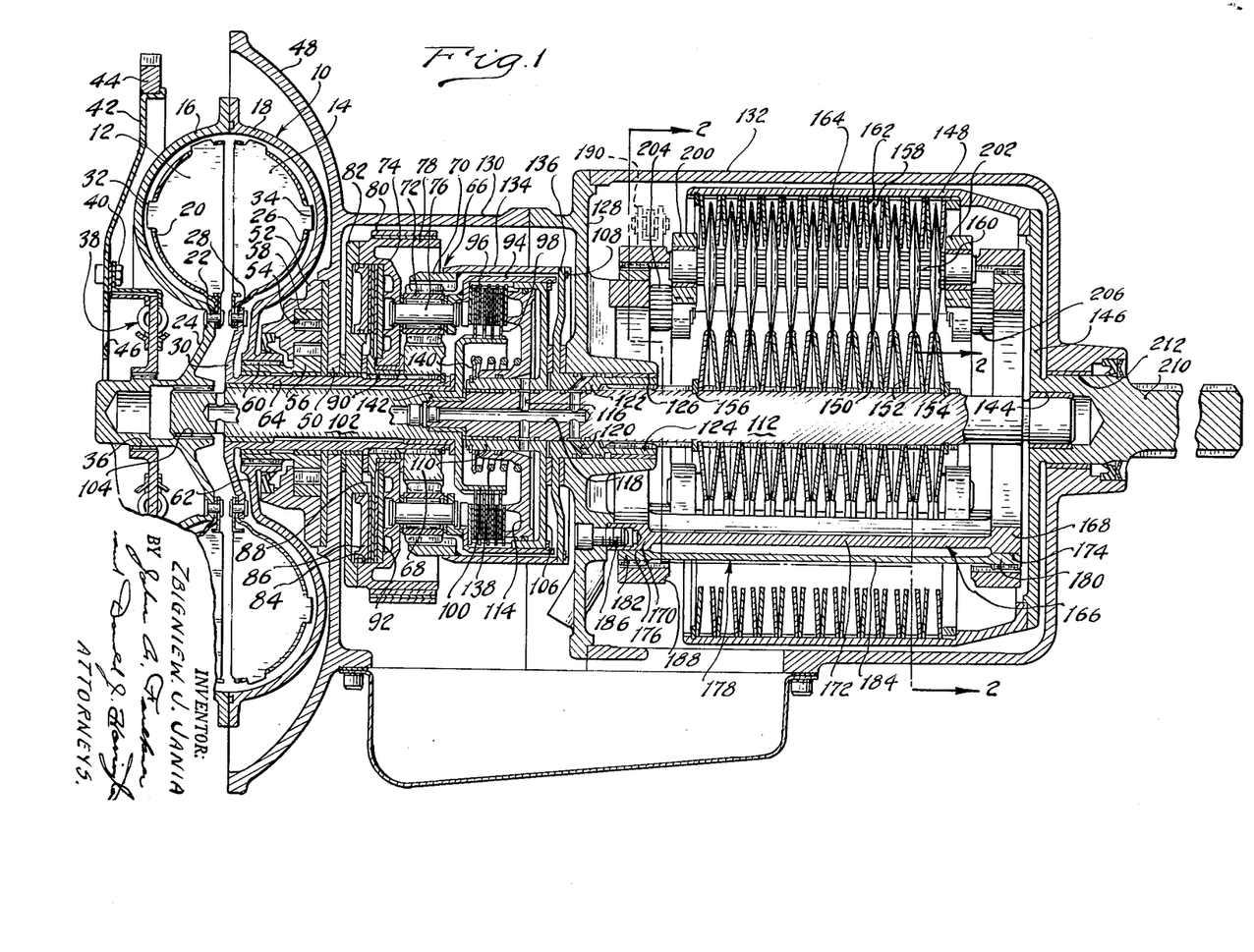
FIGURE 1 shows in cross sectional form an infinitely variable friction disc drive that embodies the improvements of my invention.

Referring first to FIGURE 1, numeral 10 designates in general a hydrokinetic fluid coupling having a bladed impeller 12 and a cooperating bladed turbine 14. The impeller and the turbine are situated in juxtaposed fluid flow relationship and are enclosed by a coupling impeller shell having two torus-shaped parts 16 and 18. Each shell part is formed with a peripheral flange to permit a welded connection between them.

An impeller shroud 20 is riveted or otherwise secured at 22 to the hub 24 of impeller shell part 16. In a similar fashion, a turbine shroud 26 is secured by rivets 28 to the hub 30 of the bladed impeller 14. Shroud 20 has secured thereto radially disposed impeller blades that are secured in place by means of tabs 32. The turbine blades of the turbine 14 similarly are provided with tabs 34 to permit a connection with the shroud 26.

Hub 24 of the shell part 16 is splined at 36 to a torsional damper assembly 38. This assembly is bolted by means of bolts 40 to a drive plate 42, the outer periphery of which carries an engine starter motor ring gear 44. The inner periphery of drive plate 42 is formed with bolt openings 46 to permit a bolted connection with a flange formed on the crankshaft of an internal combustion vehicle engine.

Coupling 10 is disposed within housing portion 48 which may be secured at its periphery to the engine block of the internal combustion engine. Housing 48 includes a wall 50 to which is secured a front pump housing 52. Positive displacement pump gears 54 and 56 are situated within a pump cavity 58 formed in the housing 52. Gear 56 is splined at 60 to the hub 62 of shell part 18.

Hub 30 of the turbine 14 is connected directly to a turbine sleeve shaft 64 which extends through pump gear element 56 in the wall 50.

A simple planetary gear unit is identified generally by reference character 66. It includes a sun gear 68, a ring gear 70 and a plurality of planet pinions 72. Pinions 72 are carried by a carrier 74 having pinion shafts 76 upon which the pinions 72 are journaled. Carrier 74 defines a brake drum 78 upon which is positioned a reverse brake band 80. A suitable fluid pressure operated brake servo can be employed for applying and releasing the brake 80 thereby anchoring selectively the carrier 74.

Carrier 74 has secured thereto an end plate 82. It cooperates with the plate 82 to define an annular cylinder 84 within which is positioned an annular piston 86. Situated directly adjacent the piston 86 is a friction clutch disc 88 having a hub 90 that is splined to the sleeve shaft 64. A back-up friction disc 92 also is carried by the carrier 74. When fluid pressure is admitted to the annular cavity defined by the cylinder 84 and the piston 86, friction disc 88 is engaged by the piston 86 thereby establishing a direct connection between the carrier 74 and the sleeve shaft 64.

A clutch drum 94 is connected directly to the carrier 74. It is internally splined to permit a driving connection with externally splined clutch discs 96. The discs are situated in interdigital relationship with respect to internally splined discs 98. These are carried by an externally splined clutch member 100 that is connected directly to a central torque delivery shaft 102. The left-hand end of shaft 102 is splined at 104 to the hub 24 of the impeller shell part 16.

Drum 94 is supported by an annular cylinder 106 which is held axially fast with respect thereto by snap ring 108. Cylinder 106 is provided with a hub 110 that is journaled rotatably upon a central torque delivery shaft 112. Disposed within the cylinder 106 is an annular piston 114 which cooperates with the cylinder 106 to define a pressure cavity. Fluid under pressure can be admitted to the cavity through a port 116 which communicates with a central passage 118. Passage 118 in turn communicates with a port 120 formed in a sleeve 122 which is splined at 124 to the shaft 112. The sleeve 122 in turn is journaled within a central opening 126 formed in the separating wall 128. This wall forms a separation between an intermediate housing portion 130 and a main housing portion 132.

A torque transfer drum 134 is connected directly to ring 70 and surrounds the drum 94. It is keyed or splined to the periphery of a drive member 136 which is connected directly to the sleeve 120.

A piston return spring 138 is situated between the piston 114 and a spring seat 140 carried by the hub 110 of the cylinder 106.

As fluid pressure is admitted to the annular cavity defined by the cylinder 106 and the piston 114, the friction discs 98 and 96 engage each other thereby establishing a direct connection between shaft 102 and the carrier 74.

Sun gear 68 is splined directly to the shaft 64. Thus, when the forward clutch shown in part at 88 is engaged, sun gear 68 becomes coupled directly to the carrier 74.

Shaft 112 extends axially through housing portion 132. It is journaled at its left-hand end within a pilot bearing opening 142 formed in shaft 102. It is journaled at its other end within a bearing opening 144 formed in the hub 146 of a disc drum 148.

Shaft 112 is externally splined to provide a driving connection with internally splined friction discs 150 and 152. The discs 150 and 152 are situated in pairs in stacked relationship on the shaft 112. They are held axially fast by spaced snap rings 154 and 156. Each disc 150 and 152 is formed with a conical shape and their outer peripheries are adapted to engage coned shaped friction discs 158 that are keyed or splined to a so-called carrier shaft 160. As best viewed in FIGURE 2, there are three shafts situated in annularly spaced relationship about the axis of shaft 112. Each shaft 160 carries a plurality of discs 158.

The periphery of discs 150 engages one side of its associated discs 158 and the periphery of discs 152 engages the other side of the associated discs 158. The resiliency of the discs 150 and 152 causes a clamping pressure to be exerted upon the discs 158 so that a frictional driving relationship can be established therebetween. The discs 150 tnd 152 hereinafter will be referred to as sun discs and the discs 158 hereinafter will be referred to as carrier discs.

The drum 148 is internally splined to establish a driving connection with externally splined spring discs 162 and 164. These discs, like the discs 150 and 152, are in the form of Belleville springs and their inner peripheries engage opposed sides of the friction surfaces of the discs 158. They are situated in pairs and a frictional driving connection is established between each disc 158 and each pair of discs 162 and 164. The resiliency of the discs 162 and 164 establishes an appropriate clamping pressure to maintain this driving relationship.

Situated within the housing portion 132 is a carrier cage 166 having axially spaced bearing portions in the form of circular bosses 168 and 170. These bosses are connected together by axially extending web members 172.

Boss 168 defines an annular bearing surface 174 and boss 170 defines a corresponding annular bearing surface 176. A concentrically disposed cage 178 surrounds cage 166 and includes bearing portions 180 and 182 which are slidably disposed upon bearing surfaces 174 and 176, respectively. These bearing portions 180 and 182 are circular in form and are interconnected by web members 184 to form an integral assembly.

Boss 170 of cage 166 is secured fast to the wall 128 by means of bolts 186.

Bosses 180 and 182 are formed with external teeth which engage the internal teeth of a ring gear 188. This ring gear is concentrically positioned with respect to the shaft 112 and is supported by the cage 178. A lug in the form of an eyelet 190 extends from ring gear 188 and is pinned or otherwise linked to a control rod 192 as best viewed in FIGURE 2. One end of rod 192 is pinned or otherwise connected to a piston rod 194 which is carried by a fluid pressure operated piston 196. Piston 196 is slidably disposed within an annular cylinder 198 that is formed in and defined by housing portion 132.

The open end of the cylinder 198 is closed by a closure member 132'. A pair of working chambers is defined by the piston 196 and the cylinder 198, one chamber being situated on either side of the piston 196.

Each shaft 160 is end supported by means of arms 200 and 202. These arms are formed with bearing openings for receiving bushings that journal the ends of shafts 160.

One end of each arm 200 and 202 carries a pinion. Each pinion is fixed to its associated arm so that the two rotate in unison. The pinion associated with arm 200 is identified in FIGURES 1 and 2 by reference character 204, and the corresponding pinion for the arm 202 is shown at 206 in FIGURE 1. Pinion 204 and its associated arm 200 are journaled upon a pinion shaft 208 which is carried by the boss 170. In a similar fashion pinion 206 is journaled upon a pinion shaft, not shown, that in turn is supported by boss 168.

It will be apparent from the foregoing that as the piston 196 is adjusted under the influence of fluid pressure admitted to the working chambers in the cylinder 198, the linear motion of the piston will be translated into rotary motion of the ring gear 188. This in turn will cause pinions 204 and 206 to rotate which results in radial adjustment of the carrier shaft 160.

Figure 2:
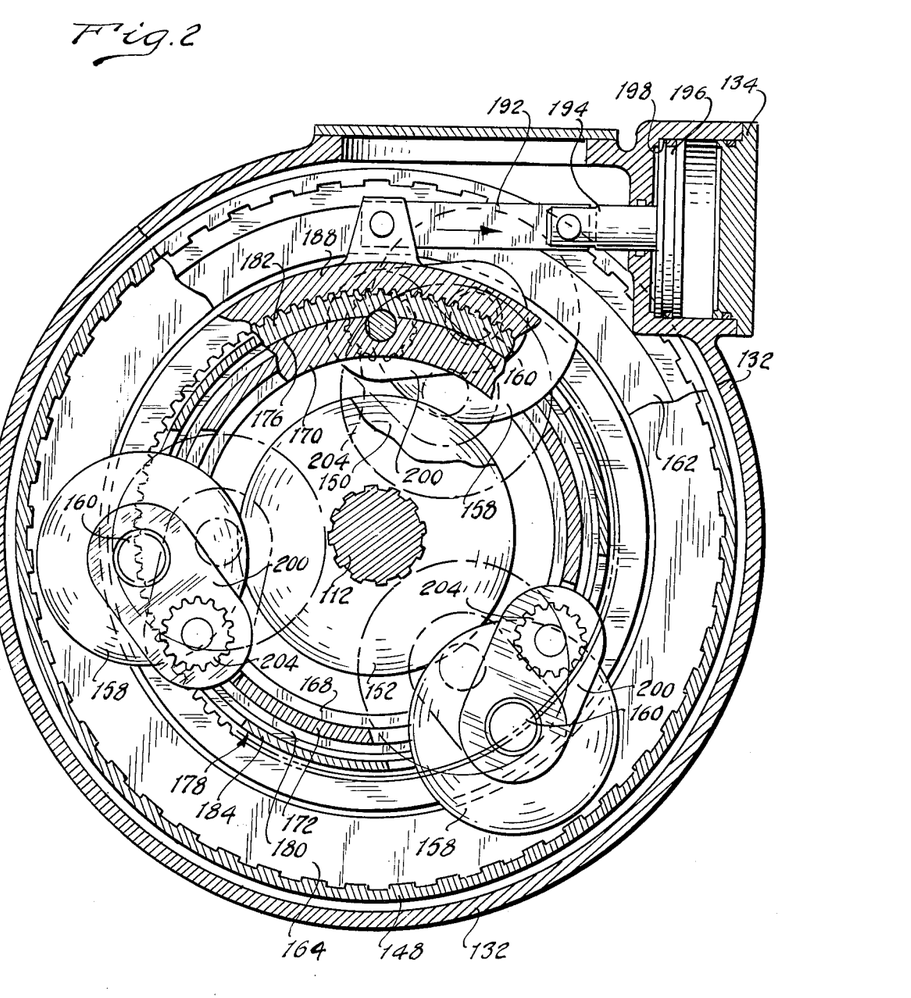
FIGURE 2 is a transverse cross sectional view taken along the plane of section line 2—2 of FIGURE 1.

There are three shafts 160 as best seen in FIGURE 2, each shaft carrying a set of conical carrier discs. These shafts have been identified by identical reference characters. Each shaft is adjusted in a radial direction in the manner described in the foregoing paragraphs. The arms and the associated pinions for each carrier shaft have been identified by identical reference characters.

The discs 162 and 164 hereinafter will be referred to as ring discs. They are disposed in driving relationship with respect to the drum 148 as explained previously, and drum 148 in turn is connected to power output shaft 210 which is journaled within a bearing opening 212 in one end of the housing portion 132.

During operation of the mechanism in the first forward driving range, the friction clutch shown in part at 188 is applied by introducing fluid pressure to the cylinder 84. Appropriate fluid passage means, not shown, can be provided for this purpose. The vehicle engine torque then is delivered through the fluid coupling 10 to the turbine shaft 64. The elements of the planetary gear unit 66 rotate in unison under these conditions since sun gear 68 is connected directly to the disc 88 and, hence, to the shaft 64. Engine torque then is delivered to the ring gear 70 and is distributed through the drum 134 to the shaft 112. Driving torque then is transmitted to the sun discs which cause the carrier discs to rotate about the axes of their respective shafts 160. The carrier discs 158 then drive the ring discs thus causing the drum and power output shaft 210 to rotate in a direction opposite the direction of rotation of the sun discs.

The speed ratio of the disc drive mechanism is dependent, of course, upon the radial position of the shafts 160. In the position shown in FIGURE 1 the disc drive mechanism is conditioned for maximum speed reduction. On the other hand, if the shafts 160 are moved radially inwardly, the speed of rotation of the ring discs increases with respect to the speed of rotation of the sun discs.

The fluid coupling provides a hydrokinetic cushion in the driveline thus making possible a smooth start as the vehicle is accelerated. The fluid coupling also functions as a neutral clutch when the clutch mechanism shown in part at 88 remains applied as the vehicle engine is idling prior to acceleration from a standing start.

After the vehicle is under way, it is desirable to establish a direct connection between the engine crankshaft and the sun discs. This is accomplished by engaging the multiple disc clutch assembly shown in part at 96 and 98. The direct connection thus established between the impeller and the ring gear bypasses the hydrokinetic coupling 10 to create a wholly mechanical drive that improves cruising efficiency under steady-state road load conditions.

To establish reverse drive, both the friction clutches shown in part at 88 and at 96 and 98 are released while the brake band 80 is applied. The carrier 74 thus becomes anchored. Engine torque then is delivered through the coupling 10 and the resulting turbine torque is delivered through shaft 64 directly to the sun gear 68. This causes reverse rotation of the ring gear 80 as the carrier 74 acts as a reaction member. The sun discs thus are driven in a reverse direction and this, of course, causes reverse rotation of the ring discs and the power output shaft 210. The overall speed ratio in the reverse drive range can be varied by appropriately adjusting the radial position of the shafts 160.

By appropriately matching the operating characteristics of the engine with the performance characteristics of the variable speed drive, the engine can be caused to operate at its most efficient speed for any given load. To illustrate this design approach, I have shown in FIGURE 3 a graph in which engine speed is plotted against the brake specific fuel consumption for each of several constant values of brake horsepower. If the engine speed is varied for any given brake horsepower, the brake specific fuel consumption will decrease progressively until it reaches a minimum value. Upon further change in engine speed, the brake specific fuel consumption again will rise. In an ideal driveline the engine would be caused to operate at the minimum specific fuel consumption point for any given constant value of brake horsepower as the engine speed varies.

Figure 3:
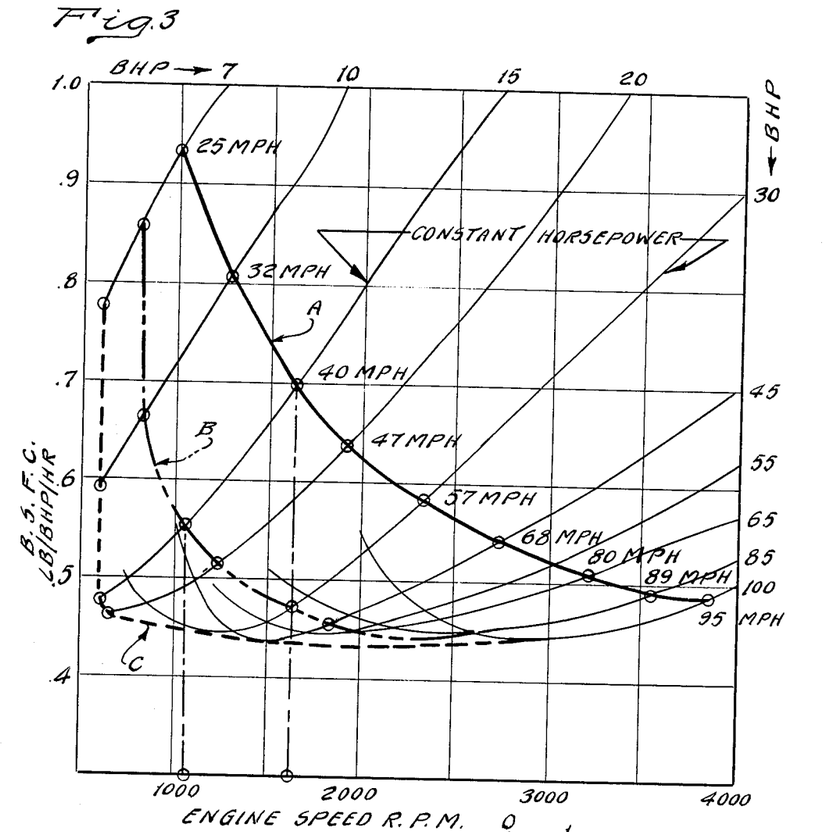
FIGURE 3 is a performance curve for a typical internal combustion vehicle engine in an automotive vehicle driveline.

In FIGURE 3 I have shown a plot that illustrates the variation in brake specific fuel consumption for various engine speeds while the engine is operating at any of the several indicated horsepower ranges. For any given transmission that is used with the engine having the performance characteristics shown in FIGURE 3, there will be a certain engine speed corresponding to any given vehicle speed, the road load requirements at that speed being determined by the constant horsepower curves. For example, in the plot shown in FIGURE 3 there is shown in Curve A the performance characteristics obtained with a conventional hydrokinetic torque converter transmission commonly employed in the automotive industry when it is used with a 312 cubic inch throttle controlled internal combustion engine. It can be seen by referring to Curve A that at a vehicle speed of 40 miles per hour, for example, at which road load requirements are 15 horsepower, the brake specific fuel consumption is .7 lbs. per brake horsepower per hour. For purposes of comparison, we have shown also in FIGURE 3 the corresponding performance characteristics that would be obtained if the same engine were used with an ideal 100 percent efficient infinitely variable torque ratio transmission. This curve is identified by the symbol B. It is an envelope curve that is tangent to the minimum brake horsepower point for each constant specific fuel consumption curve. The brake specific fuel consumption that is required to achieve a vehicle speed of 40 miles per hour and to satisfy the 15 horsepower road load requirements at that speed is equal to approximately .46 lbs. per brake horsepower per hour.

By employing the friction disc drive shown in FIGURE 1 and by utilizing the improved control system of my invention, it is possible to approach the ideal condition illustrated in FIGURE 3 by the Curve B. The performance curve that can be obtained by employing an infinitely variable transmission embodying the improvements of my invention is shown in FIGURE 3 by the Curve C. It will be observed that for any given constant horsepower and for any corresponding vehicle speed, the brake specific fuel consumption and the engine speed are substantially lower than they would be if a transmission having the characteristics of Curve A were used. It will be observed from FIGURE 3 that the brake specific fuel consumption necessary to achieve a vehicle speed of 40 miles per hour and to satisfy the brake horsepower imposed by the road conditions at that speed is equal to approximately .55 lb. per brake horsepower hour.

The Curve C shown in FIGURE 3 is achieved by maintaining the speed of the engine constant at any given accelerator linkage position and by allowing the carburetor throttle valve to be opened to a setting such that the engine will operate at the minimum possible brake specific fuel consumption point. This principle can be understood readily by referring to the schematic diagram of FIGURE 4 where I have shown the relationship between the accelerator linkage mechanism, the engine carburetor throttle and the ratio adjusting servo for the infinitely variable drive. Numeral 212 in FIGURE 4 identifies an accelerator pedal that is under the control of the vehicle operator. It is pivoted to the vehicle chassis at 214 and is connected by means of a suitable linkage 216 to a cam 218. The cam 218 is rotated as the accelerator pedal 212 is pivoted about the pivot 214.

Figure 4:
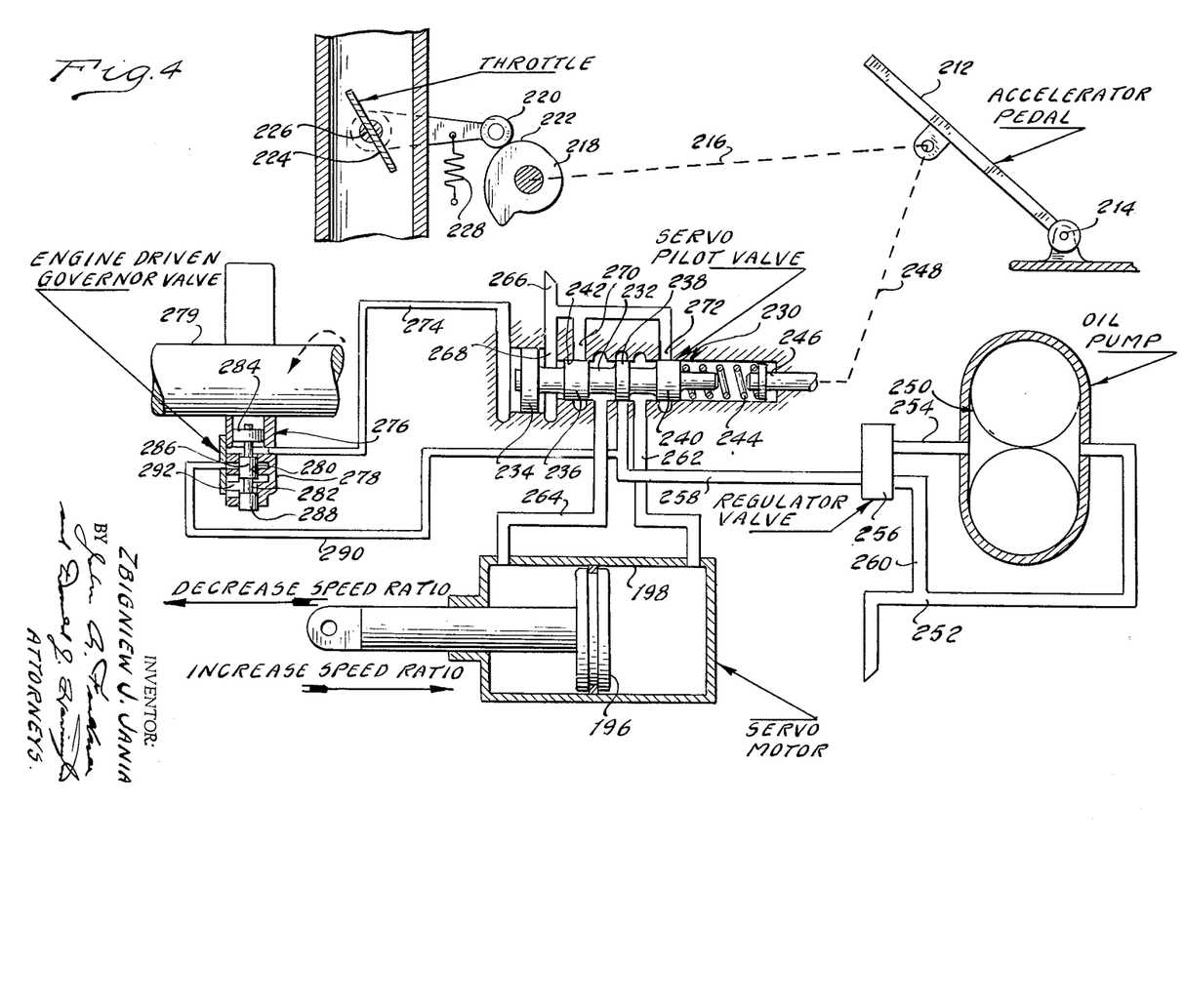
FIGURE 4 is a schematic view showing certain components of a control system for the mechanism of FIGURES 1 and 2.

A cam follower 220 engages the cam surface 222 of the cam 218 and it in turn causes a carburetor throttle valve lever to rotate. The carburetor throttle for the engine is shown at 224 and is mounted upon a throttle lever shaft 226 that is connected to the end of linkage 216. Throttle valve spring 228 normally urges the throttle 224 to an open position.

The cam 218 and the linkage 216 can be calibrated so that the engine will operate at its minimum brake specific fuel consumption point for any given accelerator position. The mechanism for providing a constant engine speed at any given accelerator position includes a servo pilot valve 230. This valve includes a multiple land valve spool 232 having spaced valve lands 234, 236, 238 and 240. These lands are slidably positioned within a valve chamber 242 having cooperating internal valve lands. Spool 232 is urged normally in a left-hand direction as viewed in FIGURE 4 by a valve spring 244 which is situated between land 240 and a valve plunger 246. The position of the plunger can be adjusted upon movement of the accelerator pedal 212 by means of appropriate linkage schematically designated at 248.

The engine driven pump shown in FIGURE 1 at 54 and 56 is designated generally in schematic form in FIGURE 4 by reference character 250. It is provided with a suitable intake passage 252 and a high pressure discharge passage 254. A main regulator valve 256 maintains a constant regulated control pressure in passage 258 which communicates with passage 254. Regulator valve 256 acts as a by-pass valve and the by-pass fluid flow is returned to the low pressure intake passage 252 by means of a by-pass passage 260.

Line pressure passage 258 communicates with valve chamber 242 at a location directly adjacent lands 238. A pressure feed passage 262 communicates with the annular cylinder 198 on one side of the piston 196. Another pressure feed passage 264 communicates with the cylinder 198 on the opposite side of the piston 196. The position of the piston 196, and hence the position of the piston rod 194, is determined by the pressure distribution across the piston 196 that is provided by feed passages 262 and 264. Passage 264 communicates with valve chamber 242 at a location intermediate valve lands 236 and 238.

An exhaust port for the pilot valve 230 is shown at 266. It is in fluid communication with three spaced exhaust grooves formed in opening 242 as indicated by reference characters 268, 270 and 272. Groove 272 normally is blocked by land 240 and groove 270 normally is blocked by land 236, while groove 268 normally is open to the exhaust port 266.

The left hand side of the land 234 is subjected to governor pressure by means of a governor pressure passage 274. This governor pressure creates a pressure force that tends to urge the spool 232 in a right hand direction against the opposing influence of spring 244.

As the accelerator pedal 212 is moved towards an advanced engine throttle position, the spring tension of spring 244 is increased thereby tending to shift the valve spool 232 in a left hand direction. This tends to increase the degree of communication between passages 258 and 262 while simultaneously decreasing the degree of communication between passages 258 and 264. This is accompanied simultaneously by a decrease in the degree of communication between passage 262 and exhaust groove 272 and an increase in the degree of communication between passage 264 and exhaust groove 270. This action results in an increase in the pressure on the right hand side of the piston 196 relative to the pressure on the left hand side thereof. This of course tends to shift the piston rod 194 in a left hand direction which tends to cause the friction disc drive to decrease its speed ratio. As soon as a reduction in the speed ratio is accomplished, the engine speed tends to increase. This of course results in an increase in the governor pressure made available to passage 274. This tends to restore the balance between the forces acting upon the spool 232 so that the pressure forces acting on either side of the piston 196 again will be stabilized with the piston rod 194 in the adjusted position.

Of course if the accelerator pedal is backed off, the spring pressure of spring 244 is decreased. This then results in a decrease in the pressure of the right hand side of the piston 196 relative to the pressure that exists on the left hand side thereof. The piston rod 194 then is displaced in a right hand direction as viewed in FIGURE 4 which results in an increase in speed ratio. This is accompanied by a corresponding decrease in the engine speed for any given road load. The resulting decrease in the governor pressure in passage 274 then results in a decrease in the governor pressure force acting upon the spool 232 so that the pilot valve forces again become balanced as the piston 196 assumes its new adjusted position.

The governor pressure signal utilized by the pilot valve is obtained by means of a governor valve mechanism 276. It includes a governor valve body 278 having a valve chamber 280 within which is slidably positioned a governor valve spool 282. This spool includes spaced valve lands 284, 286 and 288. Control pressure from the passage 258 is distributed to the valve chamber 280 through a governor feed passage 290, which communicates with the chamber 280 at a location directly adjacent land 286. Exhaust port 292 communicates with the chamber 280 at a location intermediate lands 288 and 286. Governor pressure passage 274 communicates with the chamber 280 at a location intermediate lands 284 and 286 and acts upon a differential area defined by these lands to urge the valve spood 282 normally in a radially inward direction against the opposing influence of the centrifugal force acting upon the valve spool 282. Valve body 278 is mounted for rotation upon an engine drive shaft in a suitable fashion or it may be connected directly to the engine crankshaft.

Spool 282 thus is caused to modulate the pressure in passage 290 and produce a resultant pressure signal in passage 174 that is related in magnitude to the speed of rotation of shaft 210. The actual magnitude of the governor pressure in passage 274 is equal to some constant times the square of the speed of rotation of the crankshaft.

In order to adapt the principle described with reference to FIGURE 4 to an automotive vehicle driveline, I have provided a system which can be described in general terms by means of the block diagram of FIGURE 5. An operating embodiment of the block diagram of FIGURE 5 will be described subsequently with reference to FIGURE 6.

Figure 5:
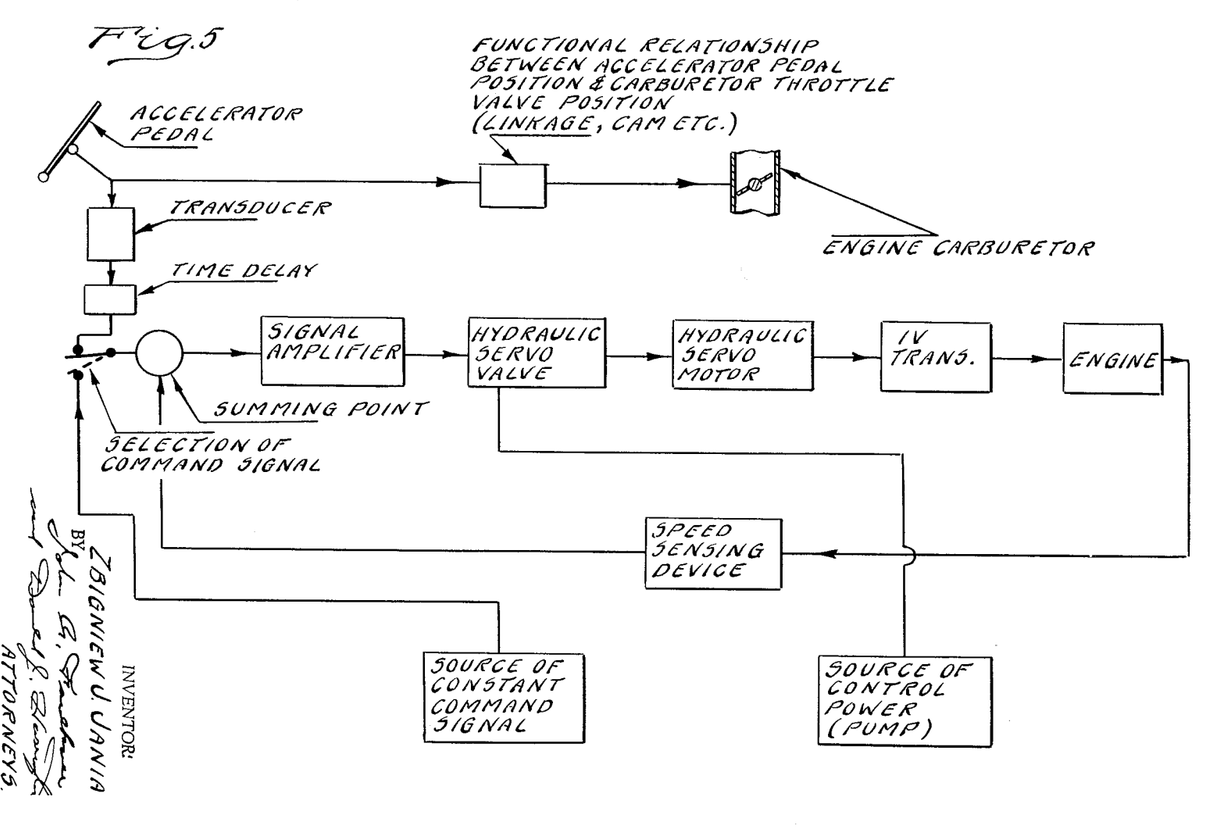
FIGURE 5 is a block diagram illustrating the functions of a control system embodying the improvements of my invention.

As seen in FIGURE 5, the accelerator pedal is connected to the engine carburetor throttle valve by means of a suitable motion transmitting mechanism which will establish the proper functional relationship between accelerator pedal position and carburetor throttle opening to permit the engine to operate at its minimum brake specific fuel consumption point for any given engine speed. The motion of the accelerator pedal is transmitted also through an appropriate transducer and time delay system to a summing point which measures the variable command signal C made available by the vehicle operator through the medium of the accelerator pedal. The summing point receives also a feed-back signal from a speed sensing device of the type shown in FIGURE 4 at 276. The difference between the command signal C and the feed-back signal F is amplified by a signal amplifier and then distributed to a servo pilot valve of the type described with reference to FIGURE 4, for example. This pilot valve receives its control pressure $P_s$ from a source such as the pump 250.

The servo valve then controls the position of the hydraulic servo motor which influences the I.V. transmission to cause the latter to vary its ratio to satisfy the engine requirements. The engine responds to the change in ratio of the transmission and this tends to result in a change in engine speed. The change in engine speed then is sensed by the speed sensing device and a feed back signal F then is supplied to the summing point.

If it is desired to overrule the command signal, a source of a constant command signal can be applied to the summing point by making an appropriate manual selection between the signal C and a constant command signal CC. This source of the constant command signal can be used, for example, when engine braking is desired.

Figure 6:
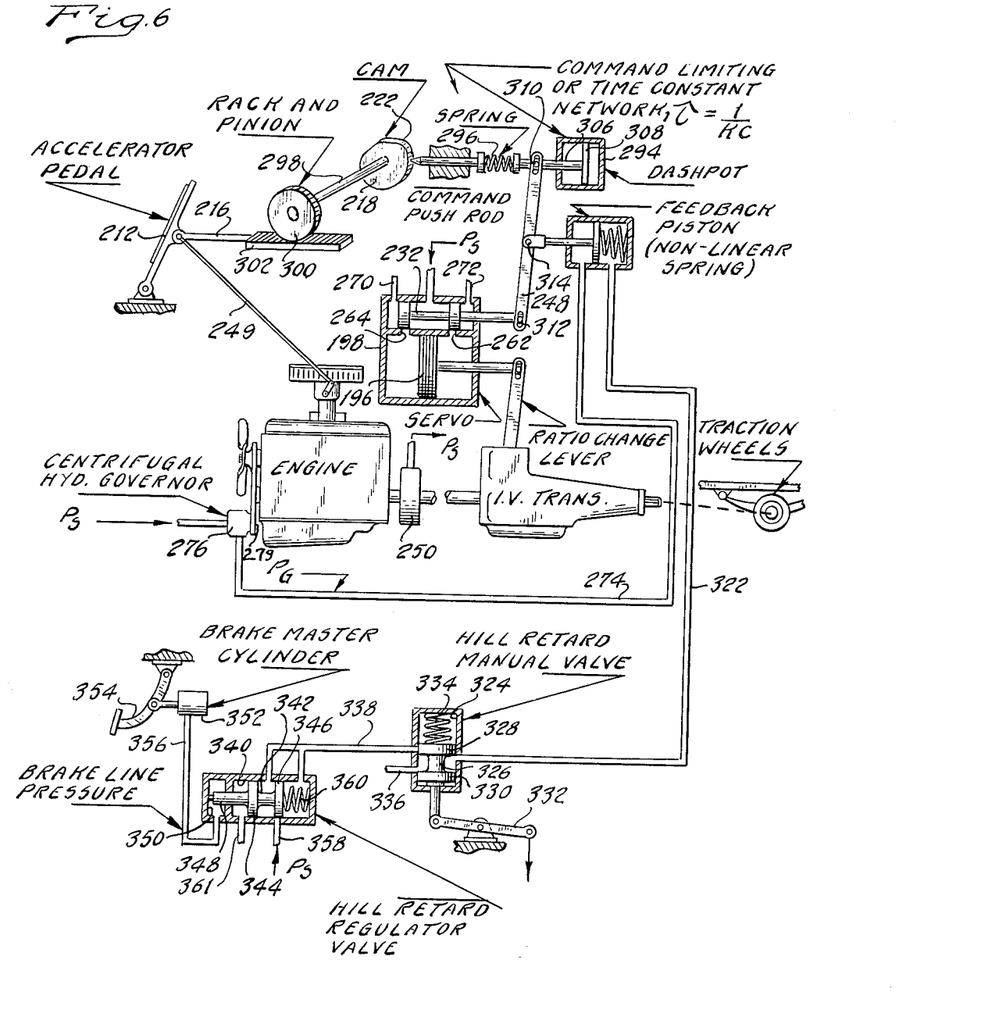
FIGURE 6 is an illustration in schematic form of an operating embodiment of the system shown in FIGURE 5.

Referring next to FIGURE 6, the command limiting or time constant network may include a dash pot 294 and a spring 296. The cam 218 may be mounted upon a cam rod 298 which carries a pinion 300. This pinion engages a rack 302 that is mechanically connected to the accelerator pedal 212 through the linkage mechanism 216. The cam surface 222 of the cam 218 engages a command push rod 304 slidably positioned within a suitable pilot opening. Spring 296 is situated between the push rod 304 and a dash pot piston rod 306. Rod 306 in turn is connected to the piston 308 of the dashpot 294.

The linkage 248 may be in the form of a lever that is pivoted at 310 to the piston rod 306. It is connected at its other end to the plunger 246 and spool 232 by an appropriate connection 312. An intermediate point 314 on the lever 248 is connected to a feed back piston 316 situated within the feed back cylinder 318. A non-linear coil spring 320 is situated within the feed back cylinder 318 and acts upon the piston 316 to urge normally the lever 248 in a left hand direction. Governor pressure from governor valve mechanism 276 is distributed through passage 274 to the left hand side of the feed back piston 316.

Figures 7, 8:
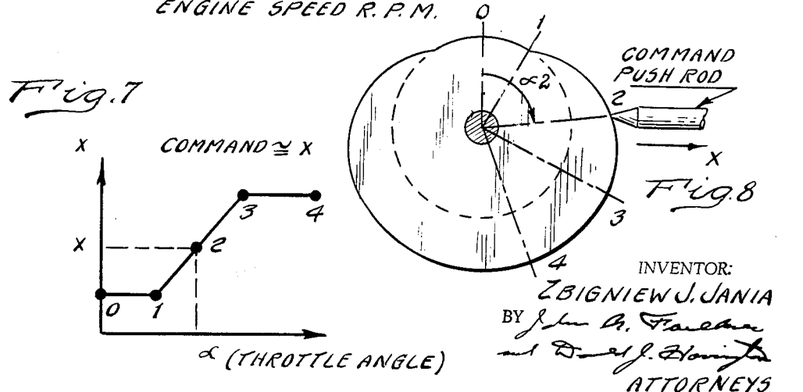
FIGURES 7 and 8 illustrate the cam geometry for the operator controlled accelerator linkage.

The cam contour of cam 218 can best be observed by referring to FIGURE 8. As the throttle angle α desired by the vehicle operator is fed into the cam 218, the command push rod is caused to be displaced a distance $x$. This distance is proportional to some command engine speed which is predetermined after the engine characteristics are known so as to give the required horsepower under minimum brake specific fuel consumption conditions. The relationship between the angle α and the command engine speed $N_e$ is illustrated in the chart of FIGURE 7.

The command push rod acts through the mechanical command limiting network and causes the spring 296 to become compressed. Initial motion of the upper end of lever 218 is delayed by reason of the action of the dash pot 294.

The pressure in passage 258 is indicated in FIGURE 6 by the symbol $P_s$. An increase in engine throttle setting will tend to move the valve spool to cause an adjustment of the piston 196 to a position which will decrease the speed ratio of the friction disc drive. This causes the engine speed to change toward the maximum economy point and this new engine speed results in a change in the governor pressure signal in passage 274. This is done by applying the governor pressure signal to the feed back cylinder 318 so that it urges the feed back piston 316 in a right hand direction as seen in FIGURE 6.

As explained previously, the governor pressure signal varies non-linearly with the engine speed. For this reason, a non-linear spring 320 must be employed so that the effect of the non-linear function of the governor pressure valve mechanism will be linear in character as it influences the pilot valve spool 232. The mechanical command limiting or time constant network is necessary in this arrangement to delay the effect of the command signal under "kickdown" conditions so that the effect of normal slower rate of response of the engine, as compared to the normal rate of response of the control system will be offset. Thus the driveline will not lose power when acceleration is required. In one operating embodiment, a time constant of about one second has been found to be ample to compensate for the differences in the rates of response of the engine and of the control system.

To accomplish coast braking a signal from a command signal source is supplied to the feed back cylinder 318 through a regulator pressure passage 322. This passage communicates with a manual valve chamber 324 within which is positioned a manual valve spool 326 having spaced valve lands 328 and 330. A manually controlled lever 332 is provided for appropriately positioning the spool 326. Spool 326 normally is urged in a downward direction by valve spring 334, but it may be displaced in an upper direction by the lever 332 if this is desired by the operator. When the valve spool 326 assumes the position shown, passage 322 communicates with an exhaust port 336. As the spool 326 is moved upwardly, however, communication is established between passage 322 and the passage 338, which extends to a hill retard or coast brake regulator valve chamber 340. Situated within chamber 340 is a valve spool 342 having spaced valve lands 344 and 346. Spool 342 includes an extension 348 that extends within a secondary valve chamber 350.

The vehicle wheel brake master cylinder 352 is pressurized by the vehicle operator by means of a conventional brake linkage mechanism 354 whenever vehicle braking is desired. This causes an increase in pressure in passage 356 which communicates with the master brake cylinder. This pressure is transmitted to chamber 350, thereby causing valve spool 342 to be urged in a right-hand direction as viewed in FIGURE 6.

Pressure from the pump 250 is supplied to the valve chamber 340 through a port 358. An exhaust port 361 communicates with the chamber 340 at a location spaced from the port 358. A spring 360 normally urges the spool 342 in a left hand direction to decrease the degree of communication between passage 388 and port 358. As the pressure in passage 356 is increased during vehicle braking, the degree of communication between passage 358 and 338 is increased. If the vehicle operator desires to utilize the variable speed drive as an auxiliary braking means, he may urge the valve spool 326 upwardly thereby allowing the pressure in passage 338 to be made available to passage 322. This pressure in turn acts upon the feed back piston 316 to supplement the action of the non-linear spring 320. This forces the friction disc drive to assume an underdrive condition and the amount of the underdrive that is established is proportional to the difference between the pressure in the master brake cylinder and the governor pressure in passage 274.

Having thus described a preferred form of my invention, what I claim and desire to secure by U.S. Letters Patent is:

1. In a driveline for a wheeled vehicle, an internal combustion engine having an air-fuel mixture intake manifold and a mixture flow controlling throttle valve, an infinitely variable friction drive comprising first friction elements drivably connected to said engine, second friction elements connected to driven portions of the driveline, third friction elements engageable with both said first and said second friction elements and adapted thereby to establish a frictional driving connection therebetween, fluid pressure operated servo means including a pressure operated piston for varying the position of said third elements relative to said first and second elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction when it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value for any given engine speed, a motion transmitting connection between said accelerator and said valve element for urging the latter in one direction with a force that is related functionally in magnitude to accelerator movement, an engine driven fluid pressure governor, a fed back mechanism including a pressure sensitive member connected to said valve element, and a fluid connection between said governor and said pressure sensitive member for subjecting the latter to a speed signal that opposes the effect of the command signal imposed by said command mechanism whereby the engine is caused to operate at an approximately constant speed for any given accelerator position.

2. In a driveline for a wheeled vehicle, an internal combustion engine having an air-fuel mixture intake manifold and a mixture flow controlling throttle valve, an infinitely variable friction drive comprising first friction elements, a fluid coupling having an impeller driven by said engine and a turbine, a planetary gear unit comprising a power input element, a power output element and a reaction element, one element of said gear unit being connected to said turbine, clutch means for connecting two elements of said gear unit together to establish a drive ratio through said gear unit of unity, second friction elements connected to driven portions of the driveline, third friction elements engageable with both said first and said second friction elements and adapted thereby to establish a frictional driving connection therebetween, fluid pressure operated servo means including a pressure operated piston for varying the position of said third elements relative to said first and second elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction when it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value for any given engine speed, a motion transmitting connection between said accelerator and said valve element for urging the latter in one direction with a force that is related functionally in magnitude to accelerator movement, an engine driven fluid pressure governor, a feed back mechanism including a pressure sensitive member connected to said valve element, and a fluid connection between said governor and said pressure sensitive member for subjecting the latter to a speed signal that opposes the effect of the command signal imposed by said command mechanism whereby said engine is caused to operate at an approximately constant speed for any given accelerator position.

3. In a driveline for a wheeled vehicle, an internal combustion engine having an air-fuel mixture intake manifold and a mixture flow controlling throttle valve, an infinitely variable friction drive comprising first friction elements, a fluid coupling having an impeller driven by said engine and a turbine, a planetary gear unit comprising a power input element, a power output element and a reaction element, one element of said gear unit being connected to said turbine and another element thereof being connected drivably to said first friction elements, first clutch means for connecting two elements of said gear unit together to establish a drive ratio through said gear unit of unity, second friction elements connected to the driven portions of said driveline, third friction elements engageable with both said first and said second friction elements and adapted thereby to establish a frictional driving connection therebetween, fluid pressure operated servo means including a pressure operated piston for varying the position of said third elements relative to said first and second elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction when it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value for any given engine speed, a motion transmitting connection between said accelerator and said valve element for urging the latter in one direction with a force that is related functionally in magnitude to accelerator movement, an engine driven fluid pressure governor, a feed back mechanism including a pressure sensitive member connected to said valve element, and a fluid connection between said governor and said pressure sensitive member for subjecting the latter to a speed signal that opposes the effect of the command signal imposed by said command mechanism whereby said engine is caused to operate at an approximately constant speed for any given accelerator position, a friction clutch means for connecting directly said impeller to said first friction elements thereby by-passing said coupling, and a reverse brake means for anchoring said reaction element during reverse drive operation when said first clutch means is released whereby said first friction elements are driven in a reverse direction.

4. In a driveline for a wheeled vehicle, an internal combustion engine having an air-fuel mixture intake manifold and a mixture flow controlling throttle valve, an infinitely variable friction drive comprising a plurality of friction elements disposed in frictional driving relationship, a driving connection between said engine and one of said friction elements, a companion friction element frictionally engaging said first friction element and connected drivably to a driven member, fluid pressure operated servo means including a pressure operated piston connected to one of said friction elements for varying the point of contact of said one friction element with its companion friction element thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction as it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value, a command limiting network for establishing a motion transmitting connection between said accelerator and said valve element for urging the latter in one direction with a force that is related functionally in magnitude to accelerator movement, said network including means for delaying the response of said valve means to movement of said accelerator, an engine driven fluid pressure governor, a feedback mechanism including a pressure sensitive member connected to said valve element and a fluid connection between said governor and said pressure sensitive member for subjecting the latter to a speed signal that opposes the effect of the command signal imposed by said command mechanism whereby the engine is caused to operate at an approximately constant speed for any given accelerator position.

5. In a driveline for a wheeled vehicle, an internal combustion engine having an air-fuel mixture intake manifold and a mixture flow controlling throttle valve, an infinitely variable friction drive comprising a plurality of friction elements disposed in frictional driving relationship, a driving connection between said engine and one of said friction elements, a companion friction element frictionally engaging said first friction element and defining therewith a torque delivery path, said companion friction element being adjustable in a direction transverse to the axis of rotation of said one friction element and being connected drivably to a driven member, fluid pressure operated servo means including a pressure operated piston connected to said companion friction element for adjusting the point of contact of said first friction element with its companion friction element thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction as it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value, a command limiting network for establishing a motion transmitting connection between said accelerator and said valve element for urging the latter in one direction with a force that is related functionally in magnitude to accelerator movement, said network including means for delaying the response of said valve means to movement of said accelerator, an engine driven fluid pressure governor, a feed back mechanism including a pressure sensitive member connected to said valve element and a fluid connection between said governor and said pressure sensitive member for subjecting the latter to a speed signal that opposes the effect of the command signal imposed by said command mechanism whereby said engine is caused to operate at a substantially constant speed for any given accelerator position, said network comprising a cam mechanically connected to said engine throttle, a cam follower engageable with said cam, a motion transmitting connection between said accelerator and said valve element for urging the latter in one direction with a force that is related functionally in magnitude to accelerator movement, spring means disposed between movable portions of said motion transmitting connection and said follower, and fluid dash pot means for opposing the biasing action of said spring means.

6. In a driveline for a wheeled vehicle, an internal combustion engine having an air-fuel mixture intake manifold and a mixture flow controlling throttle valve, an infinitely variable friction drive comprising a plurality of friction elements disposed in frictional driving relationship, a driving connection between said engine and one of said friction elements, a second friction element frictionally engaging said first friction element and a third friction element, said third friction element being connected drivably to a driven member, fluid pressure operated servo means including a pressure operated piston connected to said second friction element for varying the point of contact thereof with said first and third friction elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction as it assumes one position and to effect a pressure unbalance across said piston in the opposite direction when it assumes another position, a personally operable acelerator, a calibrated command mechanism interconnecting said throttle valve and said accelerator whereby said engine is adapted to operate with a brake specific fuel consumption of an aproximately minimum value, a command limiting network for establishing a motion transmitting connection between said accelerator and said valve element for urging the latter in one direction with a force that is related functionally in magnitude to accelerator movement, said network including means for delaying the response of said valve means to movement of said accelerator, an engine driven fluid pressure governor, a feed back mechanism including a pressure sensitive member connected to said valve element and a fluid connection between said governor and said pressure sensitive member for subjecting the latter to a speed signal that opposes the effect of the command signal imposed by said command mechanism whereby said engine is caused to operate at an aproximately constant speed for any given accelerator position, said network comprising a cam mechanically connected to said egine throttle, a cam follower engageable with said cam, a motion transmitting connection between said accelerator and said valve element for urging the latter in one direction with a force that is related functionally in magnitude to accelerator movement, spring means disposed between movable portions of said motion transmitting connection and said follower, and fluid dash pot means for opposing the biasing action of said spring means, said fluid pressure governor being centrifugally responsive and adapted to establish a pressure signal that is related exponentially to engine speed, and a non-linear spring means acting upon said pressure sensitive member to oppose the pressure force produced thereon by said governor pressure signal.

7. In a driveline for a wheeled vehicle, an internal combustion engine having an air-fuel mixture intake manifold and a mixture flow controlling throttle valve, an infinitely variable friction drive comprising first friction elements drivably connected to said engine, second friction elements connected to the driven portions of said driveline, third friction elements engagable wth both said first and said second friction elements and adapted thereby to establish a frictional driving connection therebetween, fluid pressure operated servo means including a pressure operated piston for varying the position of said third elements relative to said first and second elements, thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction when it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value for any given engine speed, a motion transmitting connection between said accelerator and said valve element for urging the latter in one direction with a force that is related functionally in magnitude to accelerator movement, an engine driven fluid pressure governor, a feed back mechanism including a pressure sensitive member connected to said valve element, a fluid connection between said governor and said member for subjecting the latter to a speed signal that opposes the effect of the command signal imposed by said command mechanism whereby said engine is caused to operate at an approximately constant speed for any given accelerator position, said fluid pressure governor being centrifugally responsive and adapted to establish a pressure signal that is related exponentially to engine speed, and a non-linear spring means acting upon said pressure sensitive member to oppose a pressure force produced thereon by said governor pressure signal.

8. In a driveline for a wheeled vehicle, an internal combustion engine having an air-fuel mixture intake manifold and a mixture flow controlling throttle valve, an infinitely variable friction drive comprising a plurality of friction elements disposed in frictional driving relationship, a driving connection between said engine and one of said friction elements, a second friction element frictionally engaging said first friction element and a third friction element, said third friction element being connected drivably to a driven member, fluid pressure operated servo means including a pressure operated piston connected to said second friction element for varying the point of contact thereof with said first and third friction elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction as it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value, a command limiting network for esttablishing a motion transmitting connection between said accelerator and said valve element for urging the latter in one direction with a force that is related functionally in magnitude to accelerator movement, said network including means for delaying the response of said valve means to movement of said accelerator, an engine driven fluid pressure governor, a feed back mechanism including a pressure sensitive member connected to said valve element and a fluid connection between said governor and said member for subjecting the latter to a speed signal that opposes the effect of the command signal imposed by said command mechanism whereby said engine is caused to operate at a substantially constant speed for any given accelerator position, said fluid pressure governor being centrifugally responsive and adapted to establish a pressure signal that is related exponentially to engine speed, and a non-linear spring means acting upon said pressure sensitive member to oppose the pressure force produced thereon by said governor pressure signal.

9. In a driveline for a wheeled vehicle, an internal combustion engine having an air-fuel mixture intake manifold and a mixture flow controlling throttle valve, an infinitely variable friction drive comprising first friction elements drivably connected to said engine, second friction elements connected to the driven portions of said driveline, third friction elements engageable with both said first and said second friction elements and adapted thereby to establish a frictional driving connection therebetween, fluid pressure operated servo means including a pressure operated piston for varying the position of said third elements relative to said first and second elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction when it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value for any given engine speed, a motion transmitting connection between said accelerator and said valve element for urging the latter in one direction with a force that is related functionally in magnitude to accelerator movement, an engine driven fluid pressure governor, a feed back mechanism including a pressure sensitive member connected to said valve element, a fluid connection between said governor and said member for subjecting the latter to a speed signal that opposes the effect of the command signal imposed by said command mechanism whereby said engine is caused to operate at an approximately constant speed for any given accelerator position, a personally operable source of braking pressure, a braking pressure regulator valve in fluid communication with said pressure source for establishing a regulated pressure that is proportional to the pressure established by said braking pressure source, and a fluid connection between said braking pressure regulator valve and said feed-back mechanism whereby braking pressure can be applied to said pressure sensitive member to oppose said governor pressure.

10. In a driveline for a wheeled vehicle, an internal combustion engine having an air-fuel mixture intake manifold and a mixture flow controlling throttle valve, an infinitely variable friction drive comprising first friction elements drivably connected to said engine, second friction elements connected to the driven portions of said driveline, third friction elements engageable with both said first and said second friction elements and adapted thereby to establish a frictional driving connection therebetween, fluid pressure operated servo means including a pressure operated piston for varying the position of said third elements relative to said first and second elements thereby providing an infinitely variable speed ratio change, a fluid pressure source, conduit structure interconnecting said source and said servo means, valve means disposed in and partly defining said conduit structure for distributing pressure to spaced portions of said servo means including an adjustable valve element adapted to effect a pressure unbalance across said piston in one direction when it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value for any given engine speed, a motion transmitting connection between said accelerator and said valve element for urging the latter in one direction with a force that is related functionally in magnitude to accelerator movement, an engine driven fluid pressure governor, a feed back mechanism including a pressure sensitive member connected to said valve element, a fluid connection between said governor and said member for subjecting the latter to a speed signal that opposes the effect of the command signal imposed by said command mechanism whereby said engine is caused to operate at a substantially constant speed for any given accelerator position, a personally operable source of braking pressure, a braking pressure regulator valve in fluid communication with said braking pressure source for establishing a regulated presure that is proportional to the pressure established by said braking pressure source, a fluid connection between said braking pressure regulator valve and said feed-back mechanism whereby braking pressure can be applied to said pressure sensitive member to oppose said governor pressure and personally operable hill retard selector valve means for selectively interrupting fluid communication between the braking pressure regulator valve and said feed-back mechanism.

11. In a driveline for a wheeled vehicle, an internal combustion engine having an air-fuel mixture intake manifold and a mixture flow controlling throttle valve, an infinitely variable friction drive comprising a plurality of friction elements disposed in frictional driving relationship, a driving connection between said engine and one of said friction elements, a companion friction element frictionally engaging said first friction element and connected drivably to a driven member, fluid pressure operated servo means including a pressure operated piston connected to one of said friction elements for varying the point of contact of said one friction element with its companion friction element thereby providing an infinitely variable speed ratio change, a fluid pressure source, conduit structure interconnecting said source and said servo means, valve means disposed in and partly defining said conduit structure for distributing pressure through spaced portions of said servo means including an adjustable valve element adapted to effect a pressure unbalance across said piston in one direction as it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ration of transmission efficiency to brake specific fuel consumption at an approximately maximum value, a command limiting network for establishing a motion transmitting connection between said accelerator and said valve element for urging the latter in one direction with a force that is related functionally in magnitude to accelerator movment, said network including means for delaying the response of said valve means to movement of said accelerator, an engine driven fluid pressure governor, a feed-back mechanism including a pressure sensitive member connected to said valve element and a fluid conection between said governor and said member for subjecting the latter to a speed signal that opposes the effect of the command signal imposed by said command mechanism whereby said engine is caused to operate at an approximately constant speed for any given accelerator position, a personally operable source of braking pressure, a braking pressure regulator valve in fluid communication with said braking pressure source for establishing a regulated pressure that is proportional to the pressure established by said braking pressure source, a fluid connection between said braking pressure regulator valve and said feed-back mechanism whereby braking pressure can be applied to said pressure sensitive member to oppose said governor pressure.

12. In a driveline for a wheeled vehicle, an internal combustion engine having an air-fuel mixture intake manifold and a mixture flow controlling throttle valve, an infinitely variable friction drive comprising a plurality of friction elements disposed in frictional driving relationship, a driving connection between said engine and one of said friction elements, a companion friction element frictionally engaging said first friction element and connected drivably to a driven member, fluid pressure operated servo means including a pressure operated piston connected to one of said friction elements for varying the point of contact of said one friction element with its companion friction element thereby providing an infinitely variable speed ratio change, a fluid pressure source, conduit structure interconnecting said source and said servo means, valve means disposed in and partly defining said conduit structure for distributing pressure through spaced portions of said servo means including an adjustable valve element adapted to effect a pressure unbalance across said piston in one direction as it assumes one position and to effect a pressure unbalance across said piston in the opposite direction when it assumes another position, a personally operable accelerator, a calibrated command mechanism interconnecting said throttle valve and said accelerator whereby said engine is adapted to operate with the ratio of transmission efficiency to brake specific fuel consumption at an approximately maximum value, a command limiting network for establishing a motion transmitting connection between said accelerator and said valve element for urging the latter in one direction with a force that is related functionally in magnitude to accelerator movement, said network including means for delaying the response of said valve means to movement of said accelerator, an engine driven fluid pressure governor, a feed back mechanism including a pressure sensitive member connected to said valve element and a fluid connection between said governor and said member for subjecting the latter to a speed signal that opposes the effect of the command signal imposed by said command mechanism whereby said engine is caused to operate at an approximately constant speed for any given accelerator position, a personally operable source of braking pressure, a braking pressure regulator valve in fluid communication with said braking pressure source for establishing a regulated pressure that is proportional to the pressure established by said braking pressure source, a fluid connection between said braking pressure regulator valve and said feed-back mechanism whereby braking pressure can be applied to said pressure sensitive member to oppose said governor pressure, and personally operable hill retard selector valve means for selectively interrupting fluid communication between said braking pressure regulator valve and said feed-back mechanism.

References Cited by the Examiner

UNITED STATES PATENTS

| | | | |
|---|---|---|---|
| 2,982,147 | 5/61 | Panhard. | |
| 3,006,206 | 10/61 | Kelley et al. | 74—472.1 X |
| 3,094,203 | 6/63 | Jania et al. | 74—472.1 X |

DON A. WAITE, *Primary Examiner.*